(12) United States Patent
Peng et al.

(10) Patent No.: US 11,361,221 B2
(45) Date of Patent: Jun. 14, 2022

(54) METHOD OF TRAINING ARTIFICIAL INTELLIGENCE TO ESTIMATE LIFETIME OF STORAGE DEVICE

(71) Applicant: STORART TECHNOLOGY CO., LTD., Hsinchu (TW)

(72) Inventors: Hsiang-En Peng, Hsinchu (TW); Sheng-Han Wu, Hsinchu (TW)

(73) Assignee: STORART TECHNOLOGY CO., LTD., Hsinchu (TW)

( * ) Notice: Subject to any disclaimer, the term of this patent is extended or adjusted under 35 U.S.C. 154(b) by 602 days.

(21) Appl. No.: 16/442,065

(22) Filed: Jun. 14, 2019

(65) Prior Publication Data
US 2020/0394510 A1    Dec. 17, 2020

(51) Int. Cl.
*G06F 3/033* (2013.01)
*G06N 3/08* (2006.01)
*G06F 3/06* (2006.01)

(52) U.S. Cl.
CPC .......... *G06N 3/08* (2013.01); *G06F 3/0616* (2013.01); *G06F 3/0629* (2013.01); *G06F 3/0683* (2013.01)

(58) Field of Classification Search
USPC .......... 706/20; 345/162, 422, 660, 532, 567, 345/536; 713/193; 365/185.18, 185.21
See application file for complete search history.

(56) References Cited

U.S. PATENT DOCUMENTS

| | | | |
|---|---|---|---|
| 2013/0238836 A1* | 9/2013 | Suzuki | G11C 16/3431 711/E12.008 |
| 2014/0226412 A1* | 8/2014 | Yeh | G11C 16/3418 365/185.21 |
| 2015/0220457 A1* | 8/2015 | Katoh | G11C 13/0069 713/193 |
| 2016/0071608 A1* | 3/2016 | Bronner | G11C 16/26 365/185.18 |
| 2016/0111163 A1* | 4/2016 | Wong | G11C 11/5628 365/185.18 |
| 2017/0133107 A1* | 5/2017 | Ryan | G06F 3/061 |
| 2017/0185299 A1* | 6/2017 | Conley | G06F 3/061 |
| 2018/0224303 A1* | 8/2018 | Geboers | G06F 11/3476 |
| 2019/0303239 A1* | 10/2019 | Hsiao | G06F 12/0246 |
| 2021/0202006 A1* | 7/2021 | Wong | G11C 11/5628 |

* cited by examiner

*Primary Examiner* — Thuy N Pardo
(74) *Attorney, Agent, or Firm* — Demian K. Jackson; Jackson IPG PLLC (57) ABSTRACT

The present disclosure provides a method of training artificial intelligence to estimate a lifetime of a storage device, which includes steps of: determining whether an operating parameter of the storage device executing a processing program on bit value values is smaller than an operational threshold parameter or not, if yes, decoding the bit value values stored in the storage device by a decoder; determining whether the bit value values stored in the storage device are successfully decoded by the decoder or not, if yes, classifying the memory unit of the storage device into a strong correct region, a weak correct region, a strong error region or a weak error region; determining whether the number of the memory units falls within an allowable number range or not, if not, initiating an artificial intelligence neural network system to use machine learning to estimate the lifetime of the storage device.

8 Claims, 8 Drawing Sheets

METHOD OF TRAINING ARTIFICIAL INTELLIGENCE TO ESTIMATE LIFETIME OF STORAGE DEVICE

FIELD OF THE DISCLOSURE

The present disclosure relates to a storage device, and more particularly to a method of training artificial intelligence to estimate a lifetime of a storage device.

BACKGROUND OF THE DISCLOSURE

Memories are seeing widespread use in recent years. However, memories may be damaged by multiple times of erasing and writing data, resulting in an increased probability of error and a significantly reduced reliability of the non-volatile memory. Therefore, it is necessary to improve the reliability of the non-volatile memory by design techniques such as error correction techniques, such that a lifetime of a product can be prolonged and an operation state of the product can be more stable.

An error correction module for correcting error data read by the non-volatile memory is disposed in a control circuit of the memory to eliminate errors caused by external factors in the non-volatile memory, thereby prolonging the lifetime of the non-volatile memory. A common error correction coding technology, such as a Bose-Chaudhuri-Hocquenghem (BCH) coding technology, is capable of fast computation and has a correction capability that increases with the increase of the number of redundant bits. However, the BCH coding technology cannot keep up with the rapid improvement of manufacturing technologies of the non-volatile memory, and cannot provide a sufficient correction capability. Therefore, a Low Density Parity Code (LDPC) error correction technology widely used in the field of communication and having a strong correction capability is now also being used in data storage.

SUMMARY OF THE DISCLOSURE

In response to the above-referenced technical inadequacies, the present disclosure provides a method of training artificial intelligence to estimate a lifetime of a storage device including a plurality of memory units. The method includes the following steps: (a) executing a data bit processing program on one or more bit values by the storage device; (b) calculating an operational parameter of the storage device executing the data bit processing program on the one or more bit values; (c) determining whether the operational parameter is smaller than a first operational threshold parameter or not, in response to determining the operational parameter to be smaller than the first operational threshold parameter, performing step (a), in response to determining the operational parameter to be not smaller than the first operational parameter, performing step (d); (d) decoding each of the bit values stored in the storage device by a decoder; (e) determining whether the bit values stored in the storage device are successfully decoded by the decoder or not, in response to determining the bit values to be successfully decoded by the decoder, performing step (a), in response to determining the bit values to be not successfully decoded by the decoder, performing step (f); (f) defining a plurality of storing state regions including a strong correct region, a weak correct region, a strong error region and a weak error region; (g) classifying each of the memory units into the strong correct region, the weak correct region, the strong error region or the weak error region, according to a storing state of each of the memory units; (h) calculating the number of the memory units classified in the storing state region; (i) determining whether the number of the memory units falls within a first allowable number range or not, in response to determining that the number of the memory units falls within the first allowable number range, performing step (a), in response to determining that the number of the memory units does not fall within the first allowable number range, performing step (j); (j) initiating an artificial intelligence neural network system to use machine learning to determine whether the operational parameter is smaller than a second operational threshold parameter, whether the bit values stored in the storage device are successfully decoded by the decoder, and whether the number of the memory units falls within a second allowable number range or not, in response to determining that the operational parameter is smaller than the second operational parameter, the bit values are not successfully decoded by the decoder, or the number of the memory units falls within the second allowable number range, performing step (a), in response to determining that the operational parameter is not smaller than the second operational parameter, the bit values are successfully decoded by the decoder, and the number of the memory units does not fall within the second allowable number range, estimating the lifetime of the storage device.

As descried above, the present disclosure provides the method of training artificial intelligence to estimate the lifetime of the storage device, which can effectively estimate the lifetime of the storage device, according to the number of times that the storage device reads, writes and erases the bit values, the busy time and other operational parameters, the error rate of accessing the data bit values by the storage device, the number of the memory units classified into the strong error region or other storing state regions, and the correction capability of the decoder on the data bit values stored in the storage device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
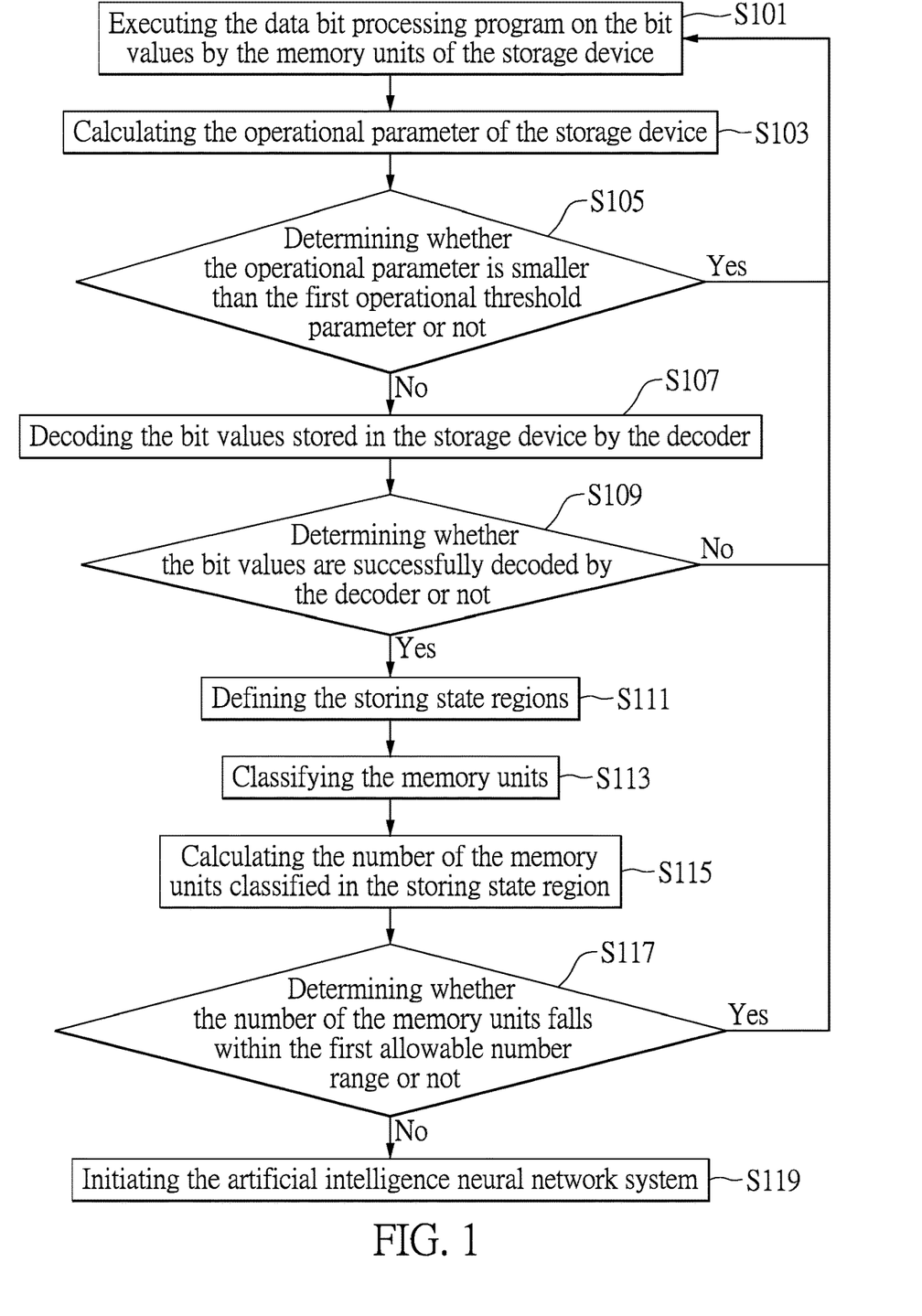
FIG. 1 is a flowchart diagram of a method of training artificial intelligence to estimate a lifetime of a storage device according to a first embodiment of the present disclosure.

Reference is made to FIG. 1, which is a flowchart diagram of a method of training artificial intelligence to estimate a lifetime of a storage device according to a first embodiment of the present disclosure. As shown in FIG. 1, the method of training artificial intelligence to estimate the lifetime of the storage device includes the following steps S101 to S119 for the storage device such as a solid state drive and so on. The storage device includes a plurality of memory units such as memory cells.

In step S101, the storage device executes a data bit processing program on one or more bit values. For example, the storage device further includes a storage controller for writing one or more data bit values or a bit stream including the data bit values to the memory units. That is, the storage controller controls the memory unit to access the one or more data bit values. Further, the storage controller of the storage device may access the data bit values stored in the memory units and control the memory units to erase the stored data bit values.

In step S103, operational parameters of the storage device executing the data bit processing program on the one or more bit values is calculated. The operational parameters includes the number of times that the storage device executes the data bit processing program, an operational time during which the storage device executes the data bit processing program each time, or a combination thereof.

In step S105, it is determined whether the operational parameter of the storage device is smaller than a first operational threshold parameter or not. For example, it is determined whether the number of times that the storage device executes the data bit processing program is smaller than a first operational count threshold or not. In addition or alternatively, it is determined whether the operational time that the storage device executes the data bit processing program each time is smaller than a first operational time threshold or not.

If the operational parameter of the storage device is smaller than the first operational threshold parameter, for example, the number of times that the storage device executes the data bit processing program is smaller than the first operational count threshold, and the operational time that the storage device executes the data bit processing program each time is smaller than the first operational time threshold, it is concluded that the storage device still has good performance. Therefore, the storage device can execute the data bit processing program again in step 101. For example, the memory unit may access new data bit values or erase the other data bit values stored in the memory units.

Conversely, the operational parameter of the storage device is equal to or larger than the first operational threshold parameter. For example, the number of times that the storage device operates is equal to or larger than the first operational count threshold, and the operational time that the storage device executes the data bit processing program each time is equal to or larger than the first operational time threshold. Under this condition, the performance of the storage device is degraded due to the storage device being operated too many times or other environmental factors, causing the storage device to operate for extended periods of time. Accordingly, it is preliminarily inferred that the lifetime of the storage device has been shortened or even that the storage device is or will soon be damaged, rendering the storage device unusable. In order to more accurately estimate the lifetime of the storage device, step S107 may next be performed.

In step S107, the one or more bit values stored in the memory units of the storage device are decoded by a decoder. More specifically, the bit values stored in the same memory unit or different memory units may be simultaneously or sequentially decoded by the decoder. Alternatively, the bit values of the same bit value stream may be simultaneously or sequentially decoded by the decoder. For example, the bit values may be sequentially decoded by the decoder in an order in which the storage device stores the bit values. Alternatively, if the memory units are arranged in an array in the storage device, an order of decoding the bit values may depend on row/column positions of the memory units arranged in the array.

In step S109, it is determined whether the bit values are successfully decoded by the decoder or not. In the embodiment, it is assumed that the decoder does not have a capability of flipping the bit values stored in the memory units of the storage device, the logic bit value of "1" stored in the memory unit cannot be flipped into the logic bit value of "0", or the logic bit value of "0" stored in the memory unit cannot be flipped into the logic bit value of "1" by the decoder. In this case, if the bit value stored in the storage device fails to be decoded by the decoder, it is determined that the bit value is wrongly identified by the storage device. For example, the storage device wrongly identifies the logic bit value of "0" as the logic bit value of "1" or identifies the logic bit value of "1" as the logic bit value of "0", and stores the wrong bit value. Under this condition, step S101 may be performed again. In step S101, the data bit value is accessed by the storage device again.

Conversely, if the bit value stored in the storage device is successfully decoded by the decoder, it is determined that the storage device correctly identifies the data bit value and stores the correct data bit value during a process of accessing the data bit value. Accordingly, it is preliminarily inferred that the storage device still has good performance. Therefore, step S111 is then performed.

In step S111, the storing state regions are defined. For example, the storing state regions may include a strong correct region, a weak correct region, a strong error region and a weak error region, etc.

In step S113, the memory unit is classified into the strong correct region, the weak correct region, the strong error region or the weak error region according to a storing state of the memory unit. For example, when a correct ratio of accessing the bit values is larger than a correct ratio threshold, the memory unit is classified into the strong correct region. Conversely, when the correct ratio of accessing the bit values is smaller than the correct ratio threshold, the memory unit is classified into the weak correct region. In addition, when an error ratio of accessing the bit values is larger than an error ratio threshold, the memory unit is classified into the strong error region. Conversely, when an error ratio of accessing the bit values is smaller than an error ratio threshold, the memory unit is classified into the weak error region.

In step S115, the number of the memory units classified into each or any one of the storing state regions such as the strong correct region, the weak correct region, the strong error region and the weak error region are calculated.

In step S117, it is determined whether the number of the memory units classified into each or any one of the storing state regions such as the strong correct region, the weak correct region, the strong error region and the weak error region falls within a first allowable number range or not. If the number of the memory units classified into each or any one of the storing state regions falls within the first allowable number range, it is concluded that the storage device is still usable. Conversely, if the number of the memory units classified into the storing state region does not fall within the first allowable number range, it is initially inferred that the storage device may be unusable.

In step S119, an artificial intelligence neural network system is initiated to use machine learning to more accurately analyze the lifetime of the storage device based on the above relevant values of the storage device. An operation of the artificial intelligence neural network system is described in more detail in the second embodiment.

Figure 2:
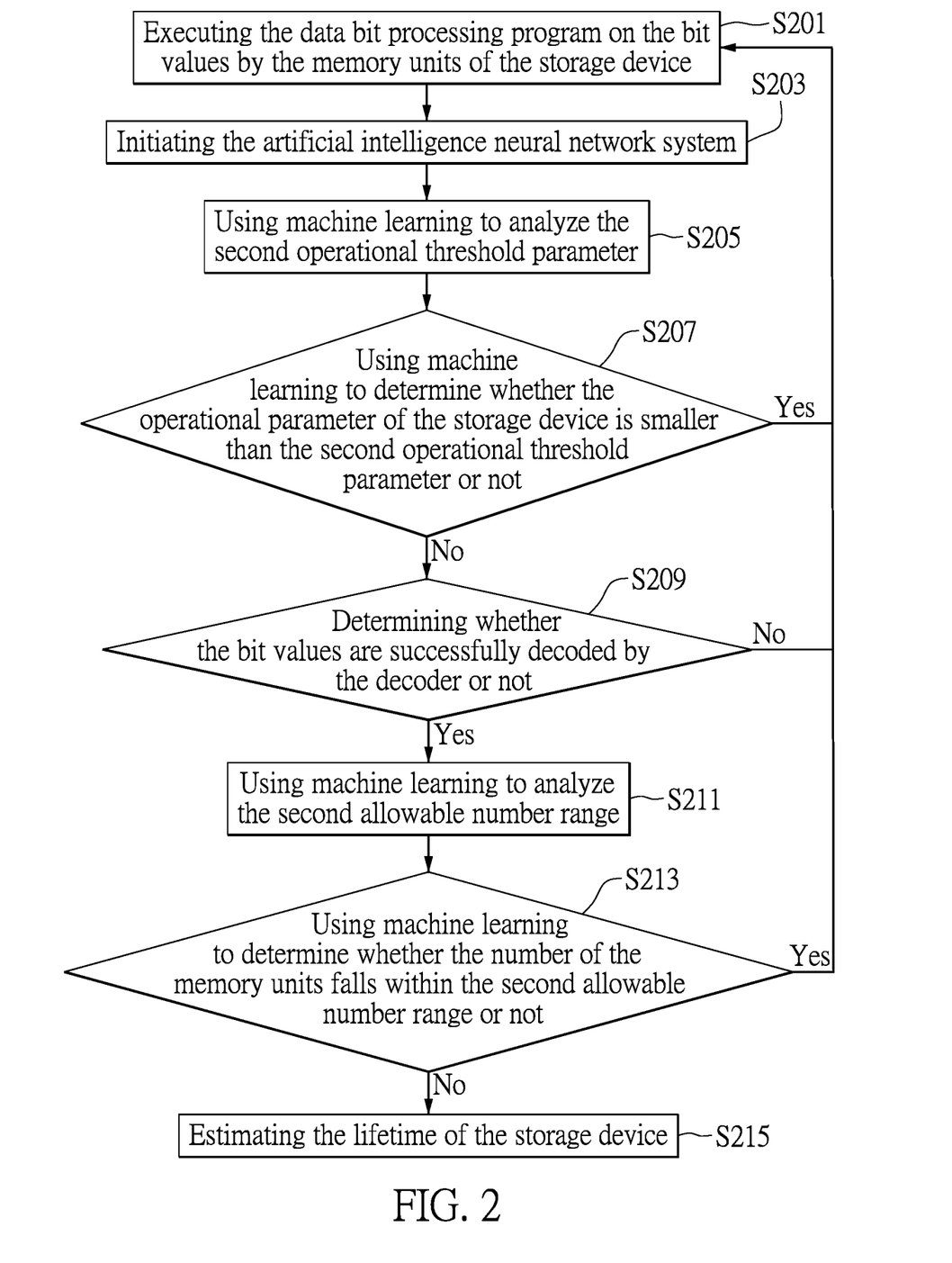
FIG. 2 is a flowchart diagram of a method of training artificial intelligence to estimate a lifetime of a storage device according to a second embodiment of the present disclosure.

Reference is made to FIG. 2, which is a flowchart diagram of a method of training artificial intelligence to estimate a lifetime of a storage device according to a second embodiment of the present disclosure. As shown in FIG. 2, the method of training artificial intelligence to estimate the lifetime of the storage device includes the following steps S201 to S215 for the storage device including the plurality of memory units. It should be understood that steps of the embodiments described herein may be implemented in any combination according to actual requirement.

After the artificial intelligence neural network system is initiated in step S119 or step S203, steps S205 to S215 may be performed. That is, the storage device is detected for the first time in steps S103 to S117 and for the second time in steps S205 to S215 such that the storage device can be accurately estimated.

Alternatively, as shown in FIG. 2, after the storage device executes the data bit processing program on the bit values in step S101 or S201, steps S103 to S117 may be omitted. The artificial intelligence neural network system is then initiated in step S203 and the lifetime of the storage device is estimated in steps S205 to S215. It should be understood that an order of steps such as steps S207, S209 and S213 may be changed according to actual requirement, for example, those steps may be performed at the same time.

In step S201, the storage device executes the data bit processing program on the bit values. For example, the storage device writes the bit value to the memory unit, reads the bit value stored in the memory unit and erases the bit value stored in the memory unit, etc.

In step S203, the artificial intelligence neural network system is initiated.

In step S205, the artificial intelligence neural network system uses machine learning to analyze different second operational threshold parameters for various types of storage devices having different lifetimes.

In step S207, the artificial intelligence neural network system uses machine learning to determine whether the operational parameter of the storage device is smaller than the second operational threshold parameter or not. In the embodiment, the second operational threshold parameter is smaller than the above first operational threshold parameter, but the present disclosure is not is limited thereto.

For example, the operational threshold parameter includes an operational time during which the storage device accesses the data bit value. If the number of the data bit values to be accessed by the storage device falls within a specific bit number range, the first operational threshold parameter such as a first access time is set to 0.5 ms, and the second operational threshold parameter such as a second access time is set to 0.2 ms. First, in step S105, the artificial intelligence neural network system uses machine learning to determine whether the time such as 0.3 ms during which the storage device accesses the data bit value is smaller than the first operational threshold parameter such as 0.5 ms or not. Then, in step S203, the artificial intelligence neural network system uses machine learning to determine whether the time such as 0.3 ms during which the storage device accesses the data bit value is smaller than the second operational threshold parameter such as 0.2 ms or not.

In practice, different operational threshold parameters may be set according to different types of storage devices. Additionally or alternatively, the operational threshold parameter may be set based on the upper limit number of the bit values that the memory units of the storage device can access and the number of the bit values that have been accessed by the memory units. For example, the upper limit number of the bit values of the memory unit of a single-level cell (SLC) is two bits and the upper limit number of the bit values of the memory units of a quad-level cell (QLC) is four bits.

If the artificial intelligence neural network system uses machine learning to determine that the operational parameter of the storage device is smaller than the second operational threshold parameter, for example, the number of times that the storage device operates is smaller than a second operational count threshold and the time during which the storage device executes the data bit processing program each time by the storage device is smaller than a second operational threshold time, it is concluded that the storage device still has good performance and is still usable. Therefore, step S201 can be performed again.

Conversely, the artificial intelligence neural network system uses machine learning to determine that the operational parameter of the storage device is larger than or equal to the second operational threshold parameter. For example, the number of times that the storage device operates is larger than or equal to the second operational count threshold and the time during which the storage device executes the data bit processing program each time is larger than or equal to the second operational threshold time. Accordingly, it is preliminarily inferred that the storage device is unusable or will soon become unusable. Further, in order to more accurately estimate the lifetime of the storage device, step S209 is then performed.

In step S209, the artificial intelligence neural network system uses machine learning to determine whether the one or more bit values stored in the memory units of the storage device are successfully decoded by the decoder or not.

If the artificial intelligence neural network system uses machine learning to determine that the bit values stored in the storage device fails to be decoded by the decoder, step S201 is performed again. Conversely, if the artificial intelligence neural network system uses machine learning to determine that the bit values stored in the storage device are successfully decoded by executing a decoding program once or multiple times by the decoder, step S211 is then performed.

In step S211, the artificial intelligence neural network system uses machine learning to analyze different second allowable number ranges for various types of storage devices having different lifetimes. The second allowable number range is smaller than the above first allowable number range, but the present disclosure is not limited thereto.

In step S213, the artificial intelligence neural network system uses machine learning to determine whether the number of the memory units classified in any one or each of the storing state regions such as the strong correct region, the weak correct region, the strong error region and the weak error region falls within the second allowable number range or not.

In step S215, the artificial intelligence neural network system is initiated to use machine learning to determine whether the storage device is still usable or unusable due to the storage device being old or damaged and in need of repair or being directly replaced with a new one, according to a determination result in steps 201 to S213. In detail, the artificial intelligence neural network system is initiated to use machine learning to perform steps S201 to S213 again to more accurately estimate whether or not the lifetime of the storage device nearly expired. For example, the artificial intelligence neural network determines whether the lifetime of the storage device is smaller than a lifetime threshold and accordingly estimates the remaining lifetime of the storage device, for example, at least half a year.

Figure 3:
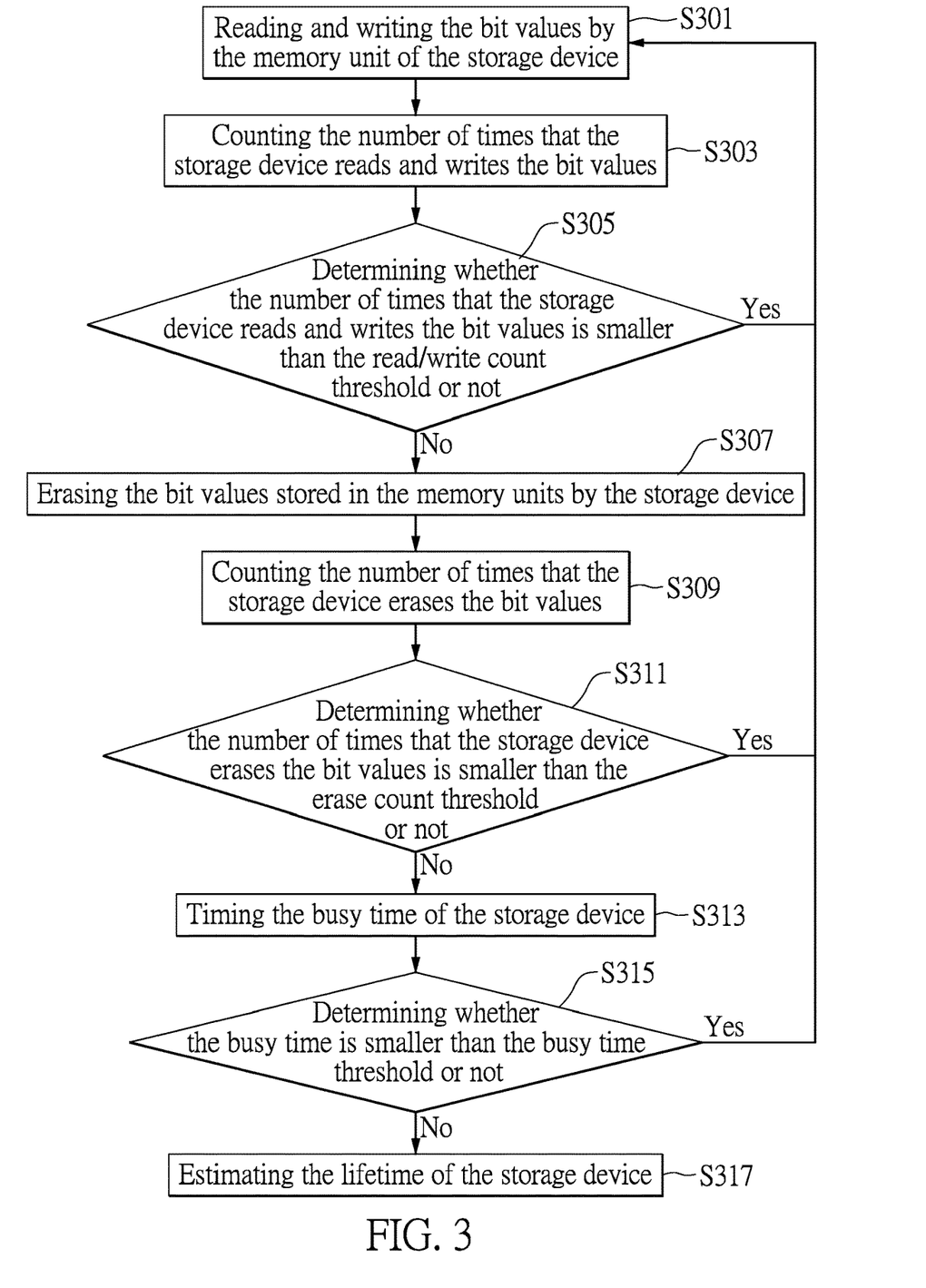
FIG. 3 is a flowchart diagram of a method of training artificial intelligence to estimate a lifetime of a storage device according to a third embodiment of the present disclosure.

Reference is made to FIG. 3, which is a flowchart diagram of a method of training artificial intelligence to estimate a lifetime of a storage device according to a third embodiment of the present disclosure. As shown in FIG. 3, the method of training artificial intelligence to estimate the lifetime of the storage device includes the following steps S801 to S817 for the storage device including the plurality of memory units. Steps S301 to S317 of the third embodiment are further examples of steps S103 and S105 of the first embodiment and steps S205 and S207 of the second embodiment. It should be understood that steps of the embodiments described herein may be implemented in any combination according to actual requirement.

In step S301, the bit value is written to the memory unit by the storage controller of the storage device. For example, only one data bit value is written to one memory unit of the storage device, a plurality of data bit values are sequentially read and written by one memory unit of the storage device, or a data bit stream including a plurality of data bit values is written to one memory unit of the storage device. The data bit value is such as logic 0 or logic 1. It should be understood that the present disclosure is not limited to the number of the data bit values that the memory units access.

In step S303 the number of times that the storage device reads and writes the bit values is counted.

In step S305, it is determined whether the accumulated number of times that the storage device reads and writes the bit values is smaller than a preset read/write count threshold or not. If the accumulated number of times that the storage device reads and writes the bit values is smaller than the preset read/write count threshold, it is concluded that the storage device is still usable to perform step S301 again. Conversely, if the accumulated number of times that the storage device reads and writes the bit values is larger than or equal to the preset read/write count threshold, subsequent steps may be performed to more accurately determine whether the storage device is still usable according to various operational parameters of the storage device.

In step S307, the one or more data bit values stored in the one or more memory units are erased by the storage controller of the storage device.

In step S309, the number of times that the storage controller of the storage device erases the data bit values stored in the memory units is counted.

In step S311, it is determined whether the accumulated number of times that the storage controller of the storage device erases the data bit values is smaller than a preset erase count threshold or not. If the accumulated number of times that the storage device erases the data bit values is smaller than the preset erase count threshold, it is concluded that the storage device is still usable to perform step S301 again. Conversely, if the accumulated number of times that the storage device erases the data bit values is not smaller than the preset erase count threshold, step S313 is then performed to determine a state of the storage device.

In step S313, a busy time of the storage device is timed. For example, the busy time during which the storage device executes the data bit processing program on the data bit values is timed. The busy time may include a time during which the storage controller receives and transmits the data bit values to the memory units, a time during which the storage controller controls the memory units to access the data bit values, and a time during which the storage controller erases the data bit values stored in the memory units.

In step S315, it is determined whether the busy time of the storage device is smaller than a busy time threshold or not. If the busy time of the storage device is smaller than the busy time threshold, the storage device is determined to have a short accumulated operational time and should thus possess good operational performance, such that step S301 can be performed again. Conversely, if the busy time of the storage device is not smaller than the busy time threshold, the storage device may be unusable and step S317 is performed.

In step S317, it is estimated whether the lifetime of the storage device is about to expire. In detail, if it is determined that the accumulated number of times that the storage device reads and writes the bit values is not smaller than the read/write count threshold in step S305, the accumulated number of times that the storage device erases the data bit values is not smaller than the preset erase count threshold in step S311 and the latest busy time of the storage device is not smaller than the busy time threshold in step S315, it is preliminarily inferred that the storage device will soon become unusable, that is, that the lifetime of the storage device is about to expire.

Figure 4:
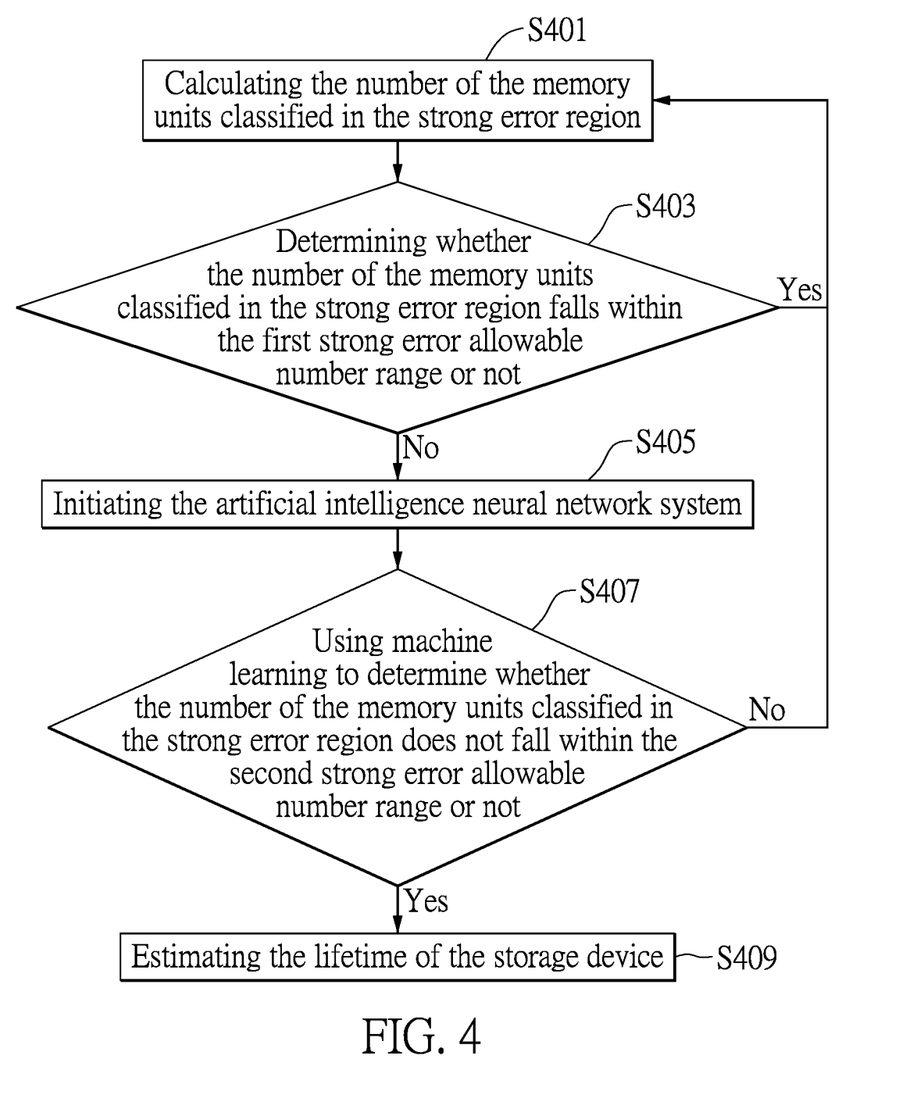
FIG. 4 is a flowchart diagram of a method of training artificial intelligence to estimate a lifetime of a storage device according to a fourth embodiment of the present disclosure.

Reference is made to FIG. 4, which is a flowchart diagram of a method of training artificial intelligence to estimate a lifetime of a storage device according to a fourth embodiment of the present disclosure. As shown in FIG. 4, the method of training artificial intelligence to estimate the lifetime of the storage device in the fourth embodiment includes steps S401 to S409 for the storage device including the plurality of memory units. Steps S401 to S403 of the fourth embodiment are further examples of steps S115 to S117 of the first embodiment and step S407 of the fourth embodiment is a further example of step S213 of the second embodiment. It should be understood that steps of the embodiments described herein may be implemented in any combination according to actual requirement.

In step S401, the memory units of the storage device are classified into the same storing state region or different storing state regions such as the strong correct region, the weak correct region, the strong error region and the weak error region, according to the storing states of the data bit values in the memory units of the storage device, and a correct rate and an error rate of accessing the data bit values by the memory units. Then, the number of the memory units classified into the strong error region is calculated. That is, the number of the memory units each having the error rate of accessing the data bit values that is larger than the error threshold is calculated.

In step S403, it is determined whether the number of the memory units classified into the strong error region falls within a first strong error allowable number range or not, or is smaller than a first strong error number threshold or not. If the number of the memory units classified into the strong error region falls within the first strong error allowable number range, or is smaller than the first strong error number threshold, it is concluded that the storage device still has a certain capability of correctly accessing the bit values and accordingly the storage device is still usable.

However, after the storage device is used again and again, the operational performance of the storage device may be degraded. For example, the correct rate of accessing the bit values by the memory units may be reduced due to the increase in the number of times that the storage device is used, the time during which the storage device is used and environmental factors, etc., resulting in the storing states of the memory units being affected As a result, the memory units are reclassified into different storing states according to different storing states thereof. For example, the memory unit that was originally classified into the weak error region is reclassified into the strong error region after the storage device is used for a long period of time. If the number of the memory units classified into the strong error region falls within the first strong error allowable number range, step S401 may be performed again. Conversely, if the number of the memory units classified into the strong error region does not fall within the first strong error allowable number range or is larger than the first strong error number threshold, step S405 is then performed.

In step S405, the artificial intelligence neural network system is initiated.

In step S407, the artificial intelligence neural network system uses machine learning to determine whether the number of the memory units classified into the strong error region falls within a second strong error allowable number range or not, or is smaller than a second strong error number threshold or not. The second strong error allowable number range may be smaller than the first strong error allowable number range. The second strong error number threshold may be smaller than the first strong error number threshold.

If the artificial intelligence neural network system uses machine learning to determine that the number of the memory units classified into the strong error region falls within the second strong error allowable number range or is smaller than the second strong error number threshold, step S401 can be performed again after a period of time. Conversely, if the artificial intelligence neural network system determines that the number of the memory units classified into the strong error region does not fall within the second strong error allowable number range or is larger than the second strong error number threshold, step S409 is then performed.

In step S409, the artificial intelligence neural network system uses machine learning to estimate the lifetime of the storage device, according to a difference between the number of the memory units in the strong error region and the second strong error number threshold.

Figure 5:
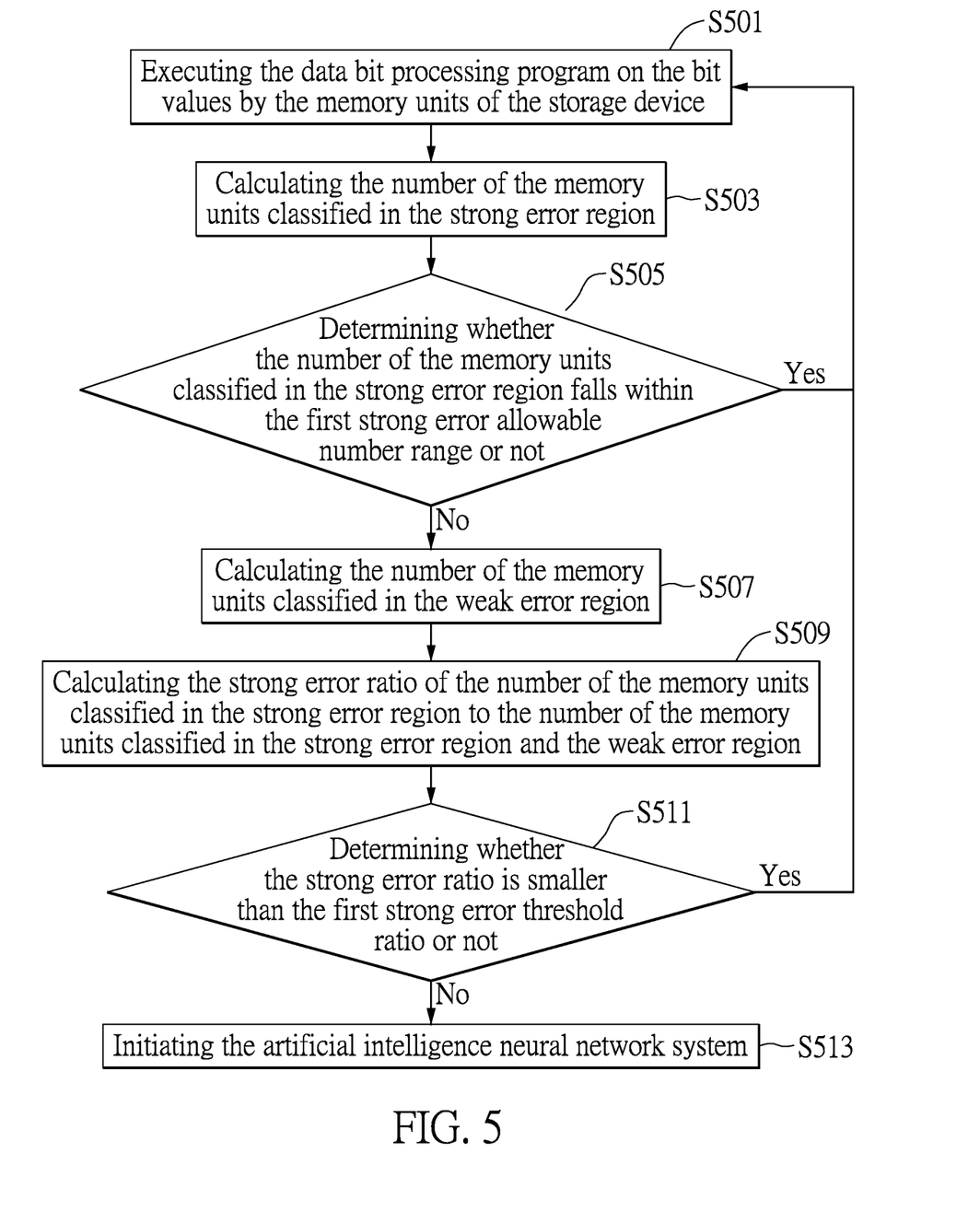
FIG. 5 is a flowchart diagram of a method of training artificial intelligence to estimate a lifetime of a storage device according to a fifth embodiment of the present disclosure.

Reference is made to FIG. 5, which is a flowchart diagram of a method of training artificial intelligence to estimate a lifetime of a storage device according to a fifth embodiment of the present disclosure. As shown in FIG. 5, the method of training artificial intelligence to estimate the lifetime of the storage device includes the following steps S501 to S513 for the storage device including the plurality of memory units. It should be understood that steps of the embodiments described herein may be implemented in any combination according to actual requirement.

Before the artificial intelligence neural network system is initiated, steps S501 to S511 are performed by using other system such as a system built in the storage controller of the storage device. Then, steps S501 to S511 are performed again by the initiated artificial intelligence neural network system, but the first strong error number threshold is replaced with a different second strong error number threshold and a first strong error threshold ratio is replaced with a different second strong error threshold ratio. In another embodiment, steps S501 to S511 are only performed after the artificial intelligence neural network system is initiated.

In step S501, the data bit processing program is executed on the bit values by the memory units of the storage device.

In step S503, the number of the memory units classified into the strong error region is calculated.

In step S505, it is determined whether the number of the memory units classified into the strong error region falls within the first strong error allowable number range or not. If the number of the memory units classified into the strong error region falls within the first strong error allowable number range, step S501 can be performed again. Conversely, if the number of the memory units classified into the strong error region does not fall within the first strong error allowable number range, step S507 is then performed.

In step S507, the number of the memory units classified into the weak error region is calculated.

In step S509, a strong error ratio (SER) of the number of the memory units in the strong error region to the number of the memory units in the strong and weak error regions is calculated, which is expressed by the following equation:

$$SER = \frac{SE}{SE + WE},$$

wherein SER represents the strong error ratio, SE represents the number of the memory units in the strong error region, and WE represents the number of the memory units in the weak error region.

In step S511, it is determined whether the strong error ratio is smaller than the first strong error threshold ratio or not. If the strong error ratio is smaller than the first strong error threshold ratio, step S501 is performed again. Conversely, if the strong error ratio is equal to or larger than the first strong error threshold ratio, step S513 is performed.

In step S513, the artificial intelligence neural network system is initiated to estimate the lifetime of the storage device. The artificial intelligence neural network system can precisely estimate the lifetime of each of the memory units of the storage device.

It should be understood that, in practice, step S505, in which the number of the memory units classified in the strong error region is compared with the first allowable number range, may be omitted. That is, only step S511, in which the strong error ratio is compared with the first strong error threshold ratio, is performed.

Figure 6:
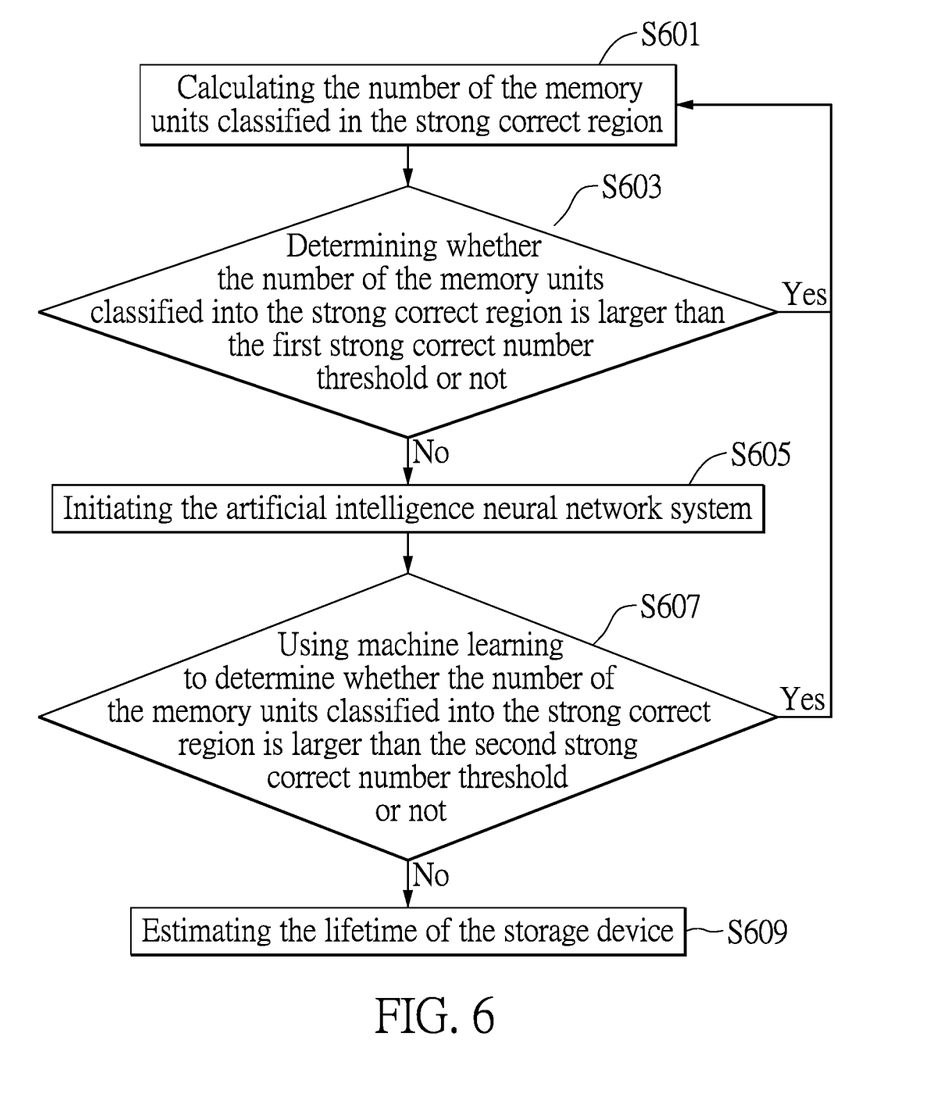
FIG. 6 is a flowchart diagram of a method of training artificial intelligence to estimate a lifetime of a storage device according to a sixth embodiment of the present disclosure.

Reference is made to FIG. 6, which is a flowchart diagram of a method of training artificial intelligence to estimate a lifetime of a storage device according to a sixth embodiment of the present disclosure. As shown in FIG. 6, the method of training artificial intelligence to estimate the lifetime of the storage device includes the following steps S601 to S609 for the storage device including the plurality of memory units. It should be understood that steps of the embodiments described herein may be implemented in any combination according to actual requirement.

In step S601, the memory units of the storage device are classified into the same storing state region or different storing state regions such as the strong correct region, the weak correct region, the strong error region and the weak error region, according to the storing states of the data bit values in the memory units of the storage device, and a correct rate and an error rate of accessing the data bit values by the memory units. Then, the number of the memory units classified into the strong correct region is calculated.

In step S603, it is determined whether or not the number of the memory units classified into the strong correct region is larger than a first strong correct number threshold such as eight memory units. If the number of the memory units such as ten memory units classified into the strong correct region is larger than the first strong correct number threshold such as the eight memory units, it is concluded that the storage device is still usable and can perform step S601 again. Conversely, if the number of the memory units such as six memory units classified into the strong correct region is smaller than or equal to the first strong correct number threshold such as the eight memory units, step S605 is then performed.

In step S605, the artificial intelligence neural network system is initiated.

In step S607, the artificial intelligence neural network system uses machine learning to determine whether the number of the memory units classified into the strong correct region is larger than a second strong correct number threshold or not. For example, the second strong correct number threshold such as five memory units is smaller than the first strong correct number threshold such as the eight memory units.

If the artificial intelligence neural network system uses machine learning to determine that the number of the memory units such as six memory units classified into the strong correct region is larger than the second strong correct number threshold such as five memory units, it is concluded that the storage device is still usable and can perform step S601 again. Conversely, the artificial intelligence neural network system uses machine learning to determine that the number of the memory units such as four memory units classified into the strong correct region is smaller than or equal to the second strong correct number threshold such as the five memory units, step S609 is then performed.

In step S609, it is estimated that the lifetime of the storage device will expire.

Figure 7:
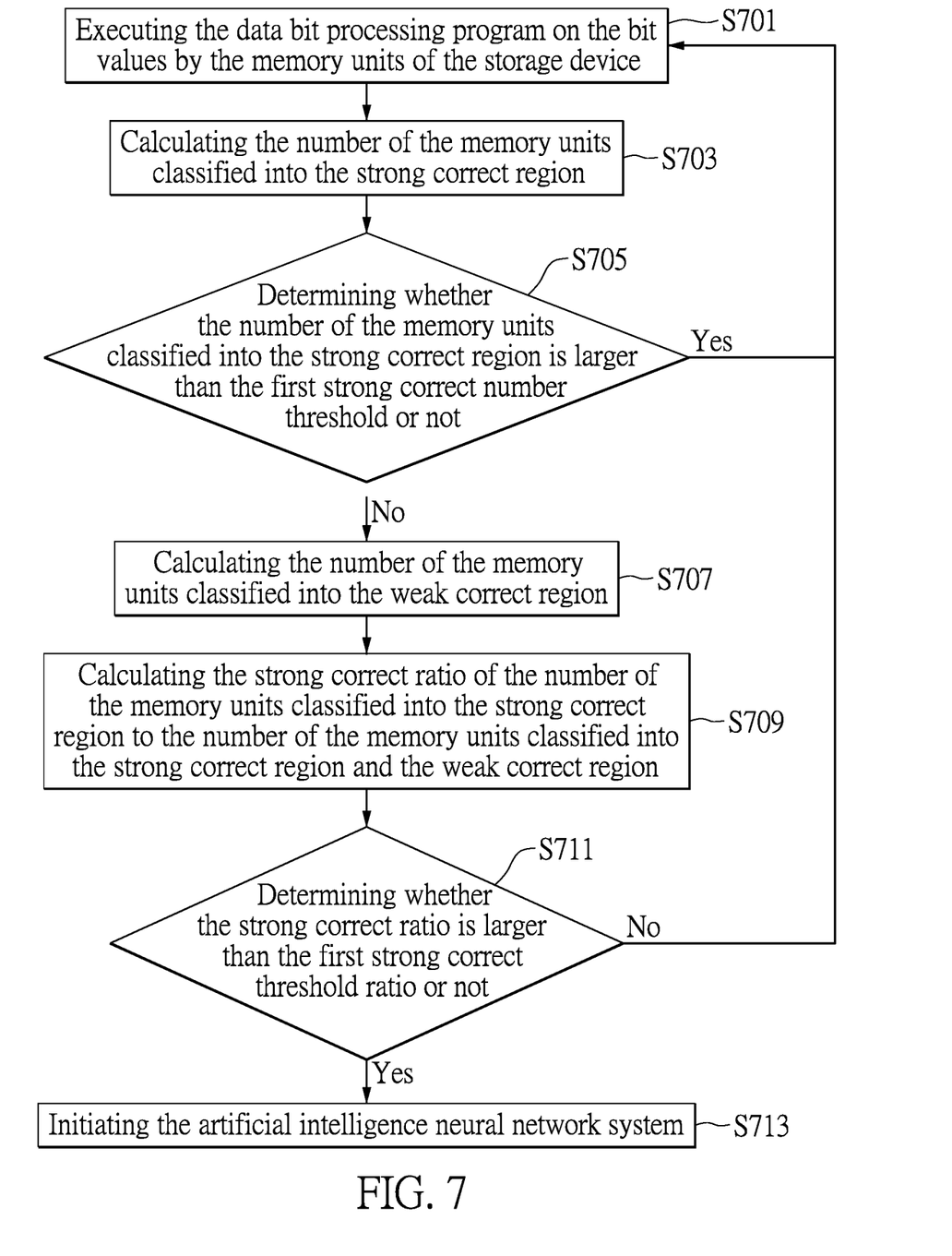
FIG. 7 is a flowchart diagram of a method of training artificial intelligence to estimate a lifetime of a storage device according to a seventh embodiment of the present disclosure.

Reference is made to FIG. 7, which is a flowchart diagram of a method of training artificial intelligence to estimate a lifetime of a storage device according to a seventh embodiment of the present disclosure. As shown in FIG. 7, the method of training artificial intelligence to estimate the lifetime of the storage device includes the following steps S701 to S713 for the storage device including the plurality of memory units. It should be understood that steps of the embodiments described herein may be implemented in any combination according to actual requirement.

In step S701, the data bit processing program is executed on the bit values by the memory units of the storage device.

In step S703, the number of the memory units classified into the strong correct region is calculated.

In step S705, it is determined whether the number of the memory units classified into the strong correct region is larger than the first strong correct number threshold. If the number of the memory units classified into the strong correct region is larger than the first strong correct number threshold, step S701 can performed again. Conversely, if the number of the memory units classified into the strong correct region is smaller than or equal to the first strong correct number threshold, step S707 is performed.

In step S707, the number of the memory units classified into the weak correct region is calculated.

In step S709, a strong correct ratio (SCR) of the number of the memory units in the strong correct region to the number of the memory units in the strong and weak correct regions is calculated, which is expressed by the following equation:

$$SCR = \frac{SC}{SC + WC},$$

wherein SCR represents the strong correct ratio, SC represents the number of the memory units in the strong correct region, and WC represents the number of the memory units in the weak correct region.

In step S711, it is determined whether the strong correct ratio is larger than the first strong correct threshold ratio or not. If the strong correct ratio is larger than the first strong correct threshold ratio, step S701 can be performed again. Conversely, if the strong correct ratio is not larger than the first strong correct threshold ratio, step S713 is performed.

In step S713, the artificial intelligence neural network system is initiated to estimate the lifetime of the storage device according to the above determination result. The artificial intelligence neural network system may be initiated to perform above steps S701 to S711 again. The first strong correct number threshold may be replaced with the different second strong correct number threshold. The first strong correct threshold ratio may be replaced with the different second strong correct threshold ratio.

As described above, the strong error ratio is calculated in the sixth embodiment and the strong correct ratio is calculated in the seventh embodiment. Alternatively, in yet another embodiment, a strong correct error ratio of the number of the memory units classified into the strong error region to the number of the memory units classified into the strong correct region is calculated. Then, it is determined whether the strong correct error ratio is smaller than a strong correct error threshold ratio or not. Alternatively, it is determined whether the number of the memory units classified into the strong error region is smaller than the number of the memory units classified into the strong correct region or not. If the strong correct error ratio is smaller than the strong correct error threshold ratio, step S701 can be performed again. Alternatively, if the number of the memory units classified into the strong error region is smaller than the number of the memory units classified into the strong correct region, step S701 can be performed again. Conversely, step S713 is performed.

Figure 8:
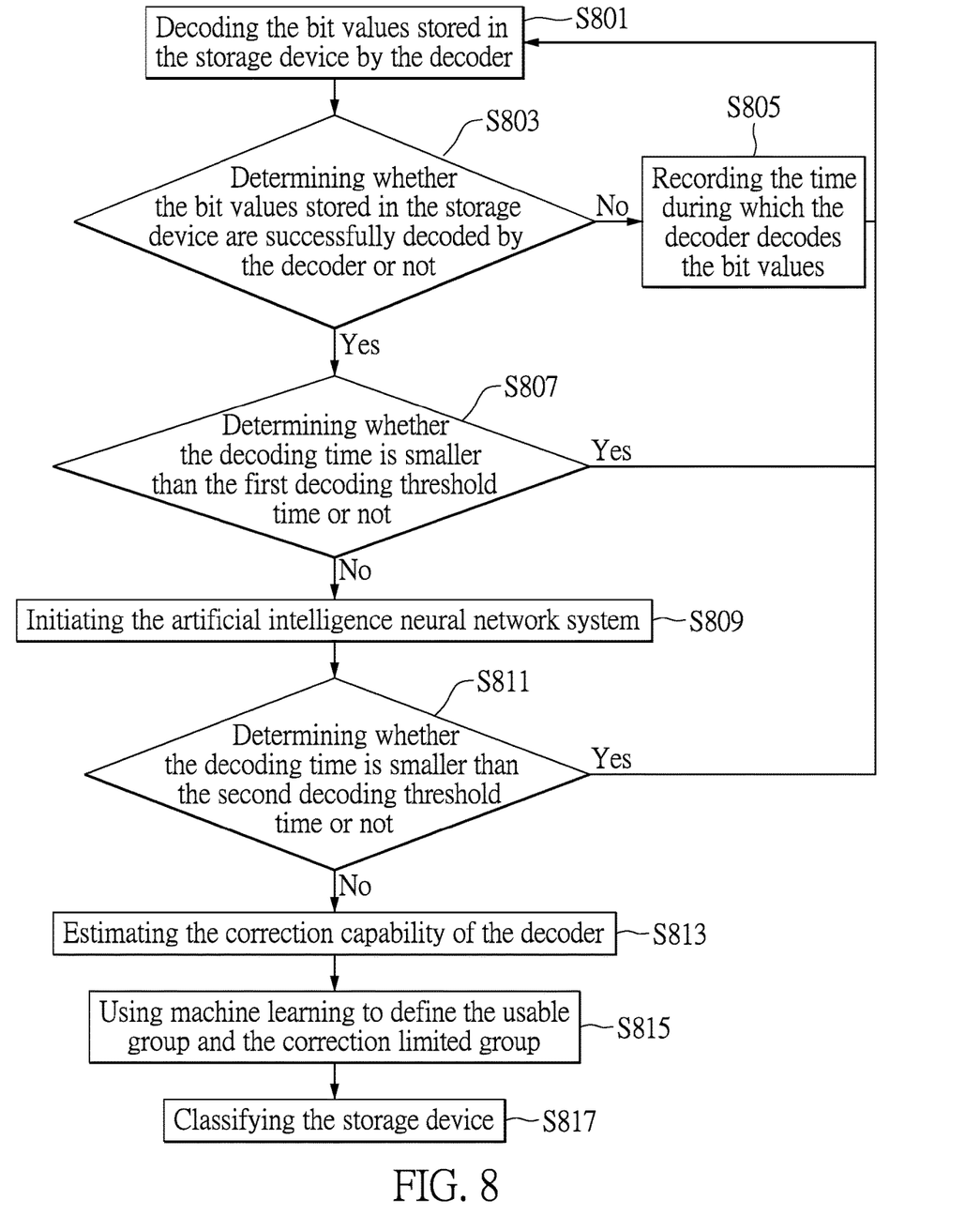
FIG. 8 is a flowchart diagram of a method of training artificial intelligence to estimate a lifetime of a storage device according to an eighth embodiment of the present disclosure.

Reference is made to FIG. 8, which is a flowchart diagram of a method of training artificial intelligence to estimate a lifetime of a storage device according to an eighth embodiment of the present disclosure. As shown in FIG. 8, the method of training artificial intelligence to estimate the lifetime of the storage device includes the following steps S801 to S817 for the storage device including the plurality of memory units. It should be understood that steps of the embodiments described herein may be implemented in any combination according to actual requirement.

In step S801, the bit values stored in the memory units of the storage device are decoded by the decoder.

In step S803, it is determined whether the bit values stored in the memory units of the storage device are successfully decoded by the decoder or not. In order to accurately estimate the lifetime of the storage device, the decoder may decode all or most of the bit values stored in the memory units of the storage device and record the time taken for each decoding, but the present disclosure is not limited thereto. In practice, only a small number of the bit values stored in the memory units may be decoded such that the time required for estimating the lifetime of the storage device can be shortened.

If the decoder fails to decode the bit values stored in the memory unit of the storage device, a time during which the decoder decodes the bit values is recorded in step S805. Step S803 is then performed again. In step S803, the bit values stored in the storage device may be flipped by the decoder at a certain probability, or the bit values re-accessed by the storage device may be decoded by the decoder. Conversely, if the bit values stored in the memory units of the storage device are successfully decoded by the decoder, step S807 is performed.

In step S807, it is determined whether the time during which the decoder decodes the bit values is smaller than a preset first decoding threshold time or not.

In step S809, the artificial intelligence neural network system is initiated.

In step S811, the artificial intelligence neural network system uses machine learning to determine whether the time during which the decoder decodes the bit values is smaller than a preset second decoding threshold time or not. The preset second decoding threshold time may be smaller than the preset first decoding threshold time.

In step S813, the artificial intelligence neural network system uses machine learning to estimate a correcting capability of the decoder on the bit values of the storage device according to the above determination result.

In detail, under an ideal condition, when the decoder decodes the bit values stored in the memory unit of the storage device, the decoder may perform a bit value correction program to flip the wrong bit value stored in the memory unit into the correct bit value at a certain probability. For example, the storage device wrongly identifies the bit value of logic "1" as the bit value of logic "0" and stores the wrong bit value of logic "0". Under this condition, the decoder needs to execute the bit value correction program to flip the bit value of wrong logic "0" back into the bit value of correct logic "1". After the wrong bit value is corrected, the memory unit of the storage device stores the correct bit value.

However, the storage device may wrongly identify a large number of data bit values or store invalid data, that is, the error rate of wrongly identifying the bit values is larger than the error rate threshold, due to performance degradation in the storage device. In addition, the decoder may be degraded to have a bad correction capability and be insufficient to effectively correct the wrong data bit values. Accordingly, it is concluded that the lifetime of the decoder and/or the storage device is about to expire and thus the decoder and/or the storage device need to be replaced with a new one.

In step S815, the artificial intelligence neural network system uses machine learning to define a usable group and a correction limited group.

In step S817, when the artificial intelligence neural network system uses machine learning to determine that the storage device is still usable according the above estimated result, the storage device is classified into the usable group. Conversely, when the artificial intelligence neural network system determines that the storage device is unusable, the storage device is classified into the correction limited group.

In summary, the present disclosure provides the method of training artificial intelligence to estimate the lifetime of the storage device, which can effectively estimate the lifetime of the storage device, according to the number of times that the storage device reads, writes and erases the bit values, the busy time and other operational parameters, the error rate of accessing the data bit values by the storage device, the number of the memory units classified into the strong error region or other storing state regions, and the correction capability of the decoder on the data bit values stored in the storage device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method of training artificial intelligence to estimate a lifetime of a storage device including a plurality of memory units, comprising the following steps:
(a) executing a data bit processing program on one or more bit values by the storage device;
(b) calculating an operational parameter of the storage device executing the data bit processing program on the one or more bit values;
(c) determining whether the operational parameter is smaller than a first operational threshold parameter or not, in response to determining the operational parameter to be smaller than the first operational threshold parameter, performing step (a), in response to determining the operational parameter to be not smaller than the first operational parameter, performing step (d);
(d) decoding each of the bit values stored in the storage device by a decoder;
(e) determining whether the bit values stored in the storage device are successfully decoded by the decoder or not, in response to determining the bit values to be successfully decoded by the decoder, performing step (a), in response to determining the bit values to be not successfully decoded by the decoder, performing step (f);
(f) defining a plurality of storing state regions including a strong correct region, a weak correct region, a strong error region and a weak error region;
(g) classifying each of the memory units into the strong correct region, the weak correct region, the strong error region or the weak error region, according to a storing state of each of the memory units;
(h) calculating the number of the memory units classified in the storing state region;
(i) determining whether the number of the memory units falls within a first allowable number range or not, in response to determining that the number of the memory units falls within the first allowable number range, performing step (a), in response to determining that the number of the memory units does not fall within the first allowable number range, performing step (j); and
(j) initiating an artificial intelligence neural network system to use machine learning to determine whether the operational parameter is smaller than a second operational threshold parameter, whether the bit values stored in the storage device are successfully decoded by the decoder, and whether the number of the memory units falls within a second allowable number range or not, in response to determining that the operational parameter is smaller than the second operational parameter, the bit values are not successfully decoded by the decoder, or the number of the memory units falls within the second allowable number range, performing step (a), in response to determining that the operational parameter is not smaller than the second operational parameter, the bit values are successfully decoded by the decoder, and the number of the memory units does not fall within the second allowable number range, estimating the lifetime of the storage device.

2. The method of claim 1, further comprising steps of:
(k) counting the number of times that the storage device reads and writes the bit values;
(l) determining whether the number of times that the storage device reads and writes the bit values is smaller than a read/write count threshold or not, in response to determining the number of times to be smaller than the read/write count threshold, performing step (a), in response to determining the number of times to be not smaller than the read/write count threshold, performing the step (m);
(m) counting the number of times that the storage device erases the bit values;
(n) determining whether the number of times that the storage device erases the bit values is smaller than an erase count threshold or not, in response to determining the number of times that the storage device erases the bit values to be smaller than the erase count threshold, performing step (a), in response to determining the number of times that the storage device erases the bit values to be not smaller than the erase count threshold, performing step (o);
(o) timing a busy time during which the storage device reads, writes or erases the bit values; and
(p) determining whether the busy time is smaller than a busy time threshold or not, in response to determining the busy time to be smaller than the busy time threshold, performing step (a), in response to determining the busy time to be not smaller than the busy time threshold, performing step (d);
wherein the operational parameter includes the number of times that the storage device reads and writes the bit values, the number of times that the storage device erases the bit values and the busy time.

3. The method of claim 1, further comprising steps of:
(q) calculating the number of the memory units classified into the strong error region;
(r) determining whether the number of the memory units classified into the strong error region falls within a first strong error allowable number range or not, in response to determining that the number of the memory units classified into the strong error region falls within the first strong error allowable number range, performing step (a), in response to determining that the number of the memory units classified into the strong error region does not fall within the first strong error allowable number range, performing step (s); and
(s) initiating the artificial intelligence neural network system to use machine learning to determine whether the number of the memory units classified into the strong error region falls within a second strong error allowable number range or not, in response to determining that the number of the memory units classified into the strong error region falls within the second strong error allowable number range, performing step (a), in response to determining that the number of the memory units classified into the strong error region does not fall within the second strong error allowable number range, estimating the lifetime of the storage device;
wherein the number of the memory units classified in the storing state region includes the number of the memory units classified into the strong error region, the first allowable number range includes the first strong error allowable number range, and the second allowable number range includes the second strong error allowable number range.

4. The method of claim 1, further comprising steps of:
(t) calculating a strong error ratio of the number of the memory units classified in the strong error region to the number of the memory units classified in the strong error region and the weak error region;

(u) determining whether the strong error ratio is smaller than a first strong error threshold ratio or not, in response to determining the strong error ratio to be smaller than the first strong error threshold ratio, performing step (a), in response to determining the strong error ratio to be not smaller than the first strong error threshold ratio or not, performing step (v); and (v) initiating the artificial intelligence neural network system to use machine learning to determine whether the strong error ratio is smaller than a second strong error threshold ratio or not, in response to determining the strong error ratio to be smaller than the second strong error threshold ratio, performing step (a), in response to determining the strong error ratio to be not smaller than the second strong error threshold ratio, estimating the lifetime of the storage device.

5. The method of claim 1, further comprising steps of:

(w) calculating the number of the memory units classified into the strong correct region;

(x) determining whether the number of the memory units classified into the strong correct region is larger than a first strong correct number threshold or not, in response to determining that the number of the memory units classified into the strong correct region is larger than the first strong correct number threshold, performing step (a), in response to determining that the number of the memory units classified into the strong correct region is not larger than the first strong correct number threshold, performing step (y); and (y) initiating the artificial intelligence neural network system to use machine learning to determine whether the number of the memory units classified into the strong correct region is larger than a second strong correct number threshold or not, in response to determining that the number of the memory units classified into the strong correct region is larger than the second strong correct number threshold, performing step (a), in response to determining that the number of the memory units classified into the strong correct region is not larger than the second strong correct number threshold, estimating the lifetime of the storage device;

wherein the number of the memory units classified in the storing state region includes the number of the memory units classified into the strong correct region.

6. The method of claim 1, further comprising steps of:

(z) calculating a strong correct ratio of the number of the memory units classified into the strong correct region to the number of the memory units classified into the strong correct region and the weak correct region;

(aa) determining whether the strong correct ratio is larger than a first strong correct threshold ratio or not, in response to determining the strong correct ratio to be larger than the first strong correct threshold ratio, performing step (a), in response to determining the strong correct ratio to be not larger than the first strong correct threshold ratio, performing step (bb); and (bb) initiating the artificial intelligence neural network system to use machine learning to determine whether the strong correct ratio is larger than a second strong correct threshold ratio or not, in response to determining the strong correct ratio to be larger than the second strong correct threshold ratio, performing step (a), in response to determining the strong correct ratio to be not larger than the second strong correct threshold ratio, estimating the lifetime of the storage device.

7. The method of claim 1, further comprising steps of:

(cc) determining whether the one or more bit values stored in the storage device are successfully decoded by the decoder or not, in response to determining that the one or more bit values are successfully decoded by the decoder, performing step (a), in response to determining that the one or more bit values are not successfully decoded by the decoder, performing step (dd);

(dd) recording a decoding time of decoding each of the bit values by the decoder;

(ee) determining whether the decoding time is smaller than a first decoding threshold time or not, in response to determining the decoding time to be smaller than the first decoding threshold time, performing step (a), in response to determining the decoding time to be not smaller than the first decoding threshold time, performing step (ff); and (ff) initiating the artificial intelligence neural network system to use machine learning to determine whether the decoding time is smaller than a second decoding threshold time or not, in response to determining the decoding time to be smaller than the second decoding threshold time, performing step (a), in response to determining the decoding time to be not smaller than the second decoding threshold time, estimating a correction capability of the decoder on the bit values stored in the storage device.

8. The method of claim 1, further comprising steps of:

(gg) initiating the artificial intelligence neural network system to use machine learning to define a usable group and a correction limited group; and (hh) using machine learning to determine whether the lifetime of the storage device is longer than a lifetime threshold or not, in response to determining the lifetime of the storage device to be longer than the lifetime threshold, classifying the storage device into the usable group, in response to determining the lifetime of the storage device to be not longer than the lifetime threshold, classifying the storage device into the correction limited group.

* * * * *